(12) United States Patent
Yoshizumi et al.

(10) Patent No.: US 8,006,402 B2
(45) Date of Patent: Aug. 30, 2011

(54) SHAPE MEASURING APPARATUS AND SHAPE MEASURING METHOD

(75) Inventors: Keiichi Yoshizumi, Osaka (JP); Masateru Doi, Osaka (JP); Takayuki Kurata, Osaka (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 12/476,518

(22) Filed: Jun. 2, 2009

(65) Prior Publication Data

US 2009/0299692 A1 Dec. 3, 2009

(30) Foreign Application Priority Data

Jun. 3, 2008 (JP) ................................ 2008-145945

(51) Int. Cl.
G01B 11/24 (2006.01)
G01B 5/20 (2006.01)
(52) U.S. Cl. .......................................... 33/556; 33/559
(58) Field of Classification Search .................... 33/551, 33/556, 559, 503, 504, 505, 1 M
See application file for complete search history.

(56) References Cited

U.S. PATENT DOCUMENTS

| | | | |
|---|---|---|---|
| 2,858,071 A | 10/1958 | Stokes | |
| 5,345,689 A | 9/1994 | McMurtry et al. | |
| 6,026,583 A * | 2/2000 | Yoshizumi et al. | 33/503 |
| 6,701,267 B2 * | 3/2004 | Noda et al. | 33/503 |
| 6,701,633 B2 * | 3/2004 | Ohtsuka | 33/552 |
| 7,065,893 B2 * | 6/2006 | Kassai et al. | 33/554 |
| 7,328,518 B2 * | 2/2008 | Taniuchi et al. | 33/553 |
| 7,389,594 B2 * | 6/2008 | Takahashi | 33/554 |
| 7,918,036 B2 * | 4/2011 | Ishikawa | 33/559 |
| 2002/0148130 A1 * | 10/2002 | Ohtsuka | 33/552 |
| 2005/0111725 A1 | 5/2005 | Noda et al. | |
| 2005/0155242 A1 * | 7/2005 | Kadowaki et al. | 33/503 |
| 2005/0204573 A1 * | 9/2005 | Kassai et al. | 33/559 |
| 2005/0263727 A1 | 12/2005 | Noda | |
| 2005/0278968 A1 * | 12/2005 | Takahashi | 33/551 |
| 2006/0117587 A1 | 6/2006 | Lotze | |

(Continued)

FOREIGN PATENT DOCUMENTS

CN 1704718 12/2005

(Continued)

OTHER PUBLICATIONS

Chinese Office Action issued May 11, 2010 (with English translation) in a Chinese application that is a foreign counterpart to the present application.

*Primary Examiner* — Yaritza Guadalupe
(74) *Attorney, Agent, or Firm* — Wenderoth, Lind & Ponack, L.L.P.

(57) ABSTRACT

A moving vector calculation unit calculates a moving vector M representing a quantity and a direction of movement of a probe on basis of a stylus displacement vector, a stylus displacement vector D, and a direction change angle θ of the stylus displacement vector D that is caused by a frictional force between a stylus 32 and the measuring surface 5$a$ during scanning of the measuring surface 5$a$ by the stylus 32. The stylus displacement vector D is a vector including a quantity and a direction of position displacement of the stylus 32 relative to the probe 5. Movement of an XY-stage 7 is controlled so that the probe 6 moves in accordance with the moving vector M.

18 Claims, 10 Drawing Sheets

U.S. PATENT DOCUMENTS

2009/0299692 A1* 12/2009 Yoshizumi et al. ............ 33/556
2009/0300930 A1* 12/2009 Ishikawa ........................ 33/559

FOREIGN PATENT DOCUMENTS

| JP | 57-33301 | 2/1982 |
| JP | 03-251346 | 11/1991 |
| JP | 3101322 | 10/2000 |
| JP | 2003-240538 | 8/2003 |
| JP | 2005-345123 | 12/2005 |
| WO | 2006/114567 | 11/2006 |

* cited by examiner

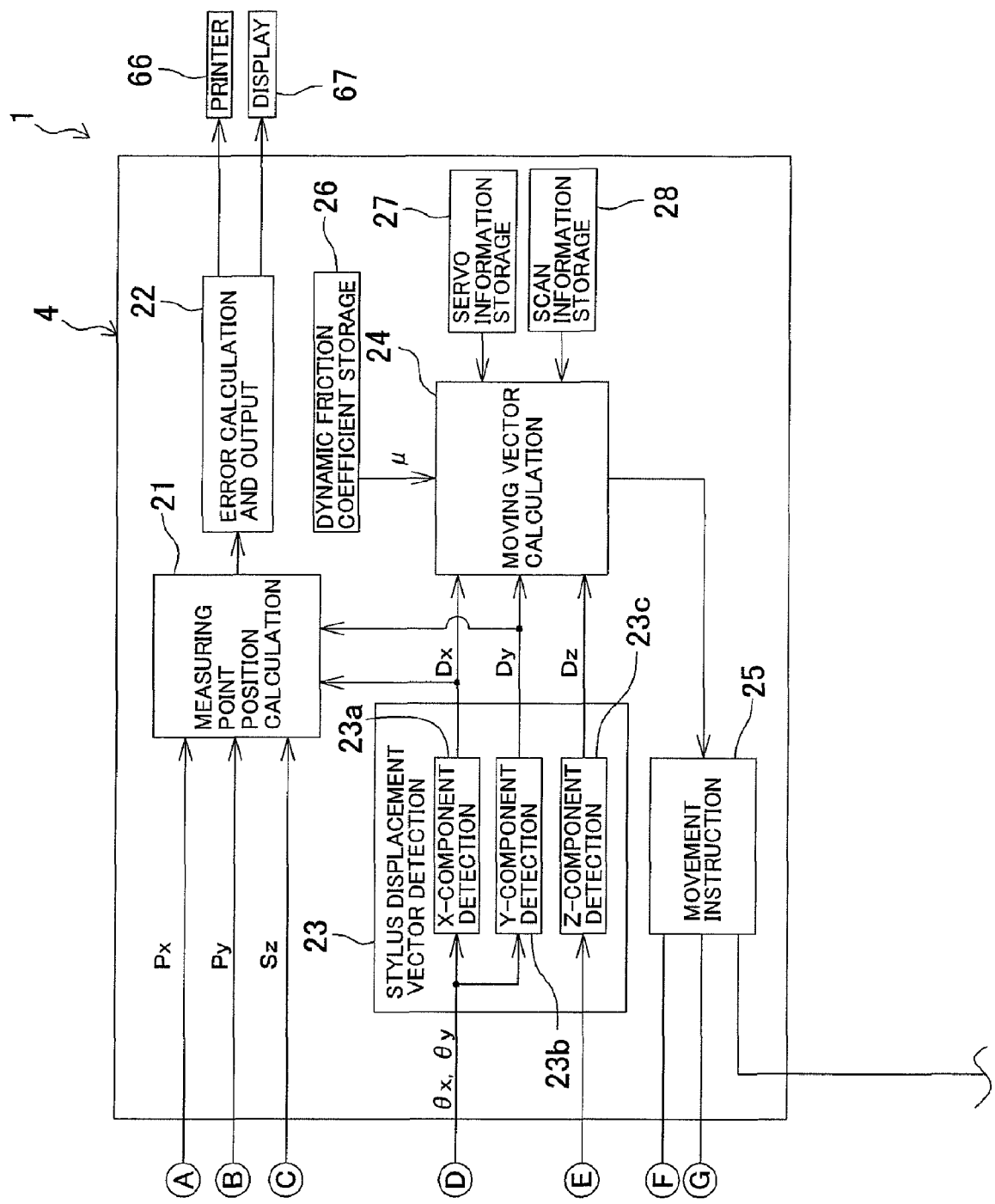

PROBE MOVES FROM "P0" TOWARD MEASURING SURFACE (SERVO-ON). (i)

S6-2

PROBE STOPS AT POSITION "P1" WHERE LENGTH OF STYLUS DISPLACEMENT VECTOR "D1" HAS PREDETERMINED VALUE "C". (i)

S6-3

PROBE MOVES FROM "P1" APPROXIMATELY BY DISTANCE "C" IN ACCORDANCE WITH MOVING VECTOR "M1" BEING PERPENDICULAR TO "D1" IN XY-PLANE AND HAVING VELOCITY "V1" AND REACHES "P". (ii)

$$\begin{pmatrix} M1x \\ M1y \end{pmatrix} = \frac{V1}{\sqrt{D1x^2 + D1y^2}} \begin{pmatrix} -D1y \\ D1x \end{pmatrix}$$

S6-4

PROBE MOVES IN ACCORDANCE WITH MOVING VECTOR "M".
MOVING VECTOR "M" HAS DIRECTION OBTAINED FROM ROTATION OF STYLUS DISPLACEMENT VECTOR "D" BY SUM OF $\theta$ =atan $\mu$ ($\mu$: DYNAMIC FRICTION COEFFICIENT) AND 90 DEGREES AND HAS VELOCITY "V". (v)

$$\begin{pmatrix} Mx \\ My \end{pmatrix} = \frac{V}{C} \begin{pmatrix} \cos(\theta + \pi/2) & -\sin(\theta + \pi/2) \\ \sin(\theta + \pi/2) & \cos(\theta + \pi/2) \end{pmatrix} \begin{pmatrix} Dx \\ Dy \end{pmatrix}$$

REPEAT UP TO SPECIFIED POSITION.

S6-5

ON "P" POSITION ARRIVING AT SPECIFIED POSITION, MOVEMENT OF PROBE IS HALTED. (vi)

S6-6

PROBE MOVES IN DIRECTION OF CURRENT STYLUS DISPLACEMENT VECTOR "D" BY DISTANCE LARGER THAN "D" (SERVO-OFF). (vi)

| PROBE MOVES FROM "P0" TOWARD MEASURING SURFACE (SERVO-ON). (i) |

S8-2

| PROBE STOPS AT POSITION "P1" WHERE LENGTH OF STYLUS DISPLACEMENT VECTOR "D1" HAS PREDETERMINED VALUE "C". (i) |

S8-3

| PROBE MOVES FROM "P1" APPROXIMATELY BY DISTANCE "C" IN DIRECTION OF "M1" PERPENDICULAR TO "D1" IN XY-PLANE AND REACHES FIRST POSITION "P". (ii) |

S8-4

| PROBE MOVES IN DIRECTION OF "M" OBTAINED FROM ADDITION OF $a(|D|-C)N$ TO VECTOR OBTAINED FROM ROTATION OF STYLUS DISPLACEMENT VECTOR "D" BY SUM OF $\theta = \mathrm{atan}\,\mu$ ($\mu$: DYNAMIC FRICTION COEFFICIENT) AND 90 DEGREES. (V) REPEAT UP TO SPECIFIED POSITION |

S8-5

| ON "P" POSITION ARRIVING AT SPECIFIED POSITION, MOVEMENT OF PROBE IS HALTED. |

S8-6

| PROBE MOVES IN DIRECTION OF CURRENT STYLUS DISPLACEMENT VECTOR "D" BY DISTANCE LARGER THAN "D" (SERVO-OFF). |

SHAPE MEASURING APPARATUS AND SHAPE MEASURING METHOD

BACKGROUND OF THE INVENTION

The present invention relates to a shape measuring apparatus and a shape measuring method for scanning a measuring surface by lightly contacting a stylus with the measuring surface, sequentially reading coordinates, and thereby measuring the shape of the measuring surface.

Extensive progresses in size reduction and performance improvement of manufactured products cause increasing needs for components having such complicated shapes as cannot be manufactured without measurement and components that require higher accuracy. For scanning measurement of arbitrary three-dimensional shapes of measuring objects such as those components, there have been provided shape measuring apparatuses that scan a measuring surface by lightly contacting a stylus with the measuring surface, sequentially reading coordinates, and thereby measuring a shape of the surface. Further, there have been proposed various techniques for automatically scanning the measuring surface by the stylus for such shape measurement.

For instance, Japanese Patent Application Laid-open Publication No. S57-33301 discloses a shape measuring apparatus in which strain gages are mounted on four sites of a probe shaft having a probe on an extremity thereof. The strain gages detect a direction and magnitude of a strain in the probe shaft caused by a measuring force from a measuring surface. Movements of the probe in a direction perpendicular to the detected direction of the measuring force can achieve automatic scanning measurement. Although not disclosing such a control as to maintain the quantity of the strain constant, this publication discloses that adding the quantity of the strain to coordinate measurement data reduces measurement errors.

Japanese Patent No. 3101322 discloses a shape measuring apparatus in which a measuring stylus is supported on a probe by support members employing disc-like springs so as to be capable of moving in directions of X-, Y-, and Z-axes. Positions of the measuring stylus relative to the probe in the directions of the X, Y and Z-axes are read from movement of a slit provided on an upper part of the measuring stylus projected onto a position-sensitive photodetector. Scanning by the probe is performed in a direction perpendicular to directions of measuring forces that have been detected.

Japanese Patent Application Laid-open Publication No. 2005-345123 discloses a shape measuring apparatus which achieves scanning measurement with generally constant measuring forces by performing scanning of the measuring surface at velocities obtained by adding velocity components for correcting increases and decreases not less than a given constant value in detected measuring forces to velocity components perpendicular to the detected measuring forces.

Japanese Patent Application Laid-open Publication No. 2003-240538 discloses a method for controlling scanning in which a probe is moved on extensions of straight lines respectively linking a former measurement point and a present measurement point and in which positions of the probe are shifted in a direction such that measuring forces recovers a given constant value if the measuring force exceeds a predetermined limit value.

In the shape measuring apparatuses disclosed in the above-first and second publications, the probe is moved in the direction perpendicular to that of the measuring force. However, the measuring force acting on the stylus is a resultant force of a force in a direction perpendicular to the measuring surface and of a frictional force that acts in a direction parallel to the measuring surface. Accordingly, the direction perpendicular to the measuring force is not coincident with the direction parallel to the measuring surface, but actually is a direction deviating from the measuring surface. Therefore, the methods disclosed in the above first and second publications result in that the probe deviating from the measuring surface.

In the shape measuring apparatus disclosed in the above third publication, decreases in the measuring force cause movements of the probe in directions for correcting the decreases (directions in which the probe is pushed toward the measuring surface), whereas recoveries of the measuring forces to the given constant value cause movements of the probe in directions such that distances from the measuring surface increase. These result in that the probe moves on a sinusoidal track with respect to the measuring surface, causing difficulty in performing smooth measurement.

According to the method disclosed in the above fourth publication, the probe moves straight on the extensions of straight lines linking the former and present measurement points until the measuring force acting on the stylus reaches the limit value even if the measuring surface is curved. Upon excess of the measuring force over the limit value, the probe moves in a direction perpendicular to the extension for correction. These result in that the stylus fails to move smoothly along the measuring surface and the measurement force is inconstant. Further, in case that the measurement surface forms a wall constituting an angle smaller than a right angle, the measuring force is not corrected even though the probe moves in the direction perpendicular to the extension upon detection of excess of the measuring force over the limit value. Thus, in this case, the probe needs to return an initial position and perpendicularly turn its course, resulting in unsmooth scanning measurement.

As described above, the conventional scanning measuring methods have failed to achieve and suggest smooth scanning measurement. The failure to perform smooth scanning causes vibration which increases measurement error as well as increase in measuring time.

SUMMARY OF INVENTION

In a shape measuring apparatus and a shape measuring method in which a measuring surface is scanned by contacting a stylus with the measuring surface so that coordinates are sequentially read, it is an object of the present invention to perform scanning by the stylus smoothly moving along the measuring surface, thereby achieving shape measurement with high accuracy and high speed.

A first aspect of the present invention provides a shape measuring apparatus comprising a probe for supporting a stylus so that the stylus can be displaced by a measuring force from a measuring surface, a moving unit for moving a relative position between the probe and the measuring surface so that the stylus scans the measuring surface, a stylus displacement vector detection unit for detecting a stylus displacement vector representing a quantity and a direction of position displacement of the stylus relative to the probe, a moving vector calculation unit for calculating a moving vector representing a quantity and a direction of movement of the probe during scanning of the measuring surface by the stylus on basis of the stylus displacement vector and a direction change angle of the stylus displacement vector caused by a frictional force between the stylus and the measuring surface, and a movement control unit for controlling the moving unit so that the probe moves in accordance with the moving vector.

Specifically, the moving vector calculation unit calculates the moving vector as a vector obtained from rotation of the stylus displacement vector by a sum of the direction change angle and 90 degrees.

This arrangement enables detection of a direction perpendicular to the measuring surface from the measuring force and scanning measurement of the measuring surface by moving the stylus in a direction parallel to the measuring surface even if the measuring surface has arbitrary inclinations and the direction of the measuring force is not perpendicular to the measuring surface due to a frictional force.

Alternatively, the moving vector calculation unit calculates a first vector obtained from rotation of the stylus displacement vector by a sum of the direction change angle and 90 degrees. Further, the moving vector calculation unit calculates a second vector by multiplying a vector obtained from rotation of the stylus displacement vector by the direction change angle and oriented substantially perpendicular to the measuring surface by a scalar value, the scalar value being obtained by multiplying a difference, which is obtained by subtracting a predetermined value from a magnitude of the stylus displacement vector, by a predetermined coefficient. Furthermore, the moving vector calculation unit calculates the moving vector as a sum of the first and second vectors.

This arrangement enables detection of the direction perpendicular to the measuring surface from the measuring force and scanning measurement of the measuring surface by moving the stylus in the direction parallel to the measuring surface, even if the measuring surface has arbitrary inclinations and the direction of the measuring force is not perpendicular to the measuring surface due to the frictional force. Further, according to this arrangement, the magnitude of the stylus displacement vector is maintained at a predetermined value irrespective of change in an inclination angle of the measuring surface. In other words, the scanning can be performed so as not to cause change in the magnitude of the stylus displacement vector and the scanning by the stylus can be performed more accurately in the direction parallel to the measuring surface irrespective of the change in the inclination angle of the measuring surface.

Provided that a dynamic friction coefficient between the stylus and the measuring surface has already been known, the direction change angle of the stylus displacement vector caused by a frictional force on the measuring surface is obtained as an arctangent of the dynamic friction coefficient.

The direction change angle may be an actually measured value. Specifically, the moving vector calculation unit calculates the direction change angle on basis of a difference between a first stylus displacement vector when the stylus scans a path on the measuring surface in a first direction and a second stylus displacement vector when the stylus scans the same path on the measuring surface in a second direction opposite to the first direction.

At start of scanning of the measuring surface by the stylus, the movement control unit moves the probe to an initial position at which the stylus is in contact with the measuring surface and the magnitude of the stylus displacement vector has a predetermined value, and then moves the probe by a predetermined distance in a direction perpendicular to the stylus displacement vector at the initial position. The predetermined distance from the initial position is set to the same value as the predetermined value when the probe moves to the initial position.

A second aspect of the present invention provides a shape measuring method comprising, moving a relative position between a probe and a measuring surface so that a stylus scans the measuring surface, the stylus being supported so as to be capable of displacing relative to the prove by a measuring force from the measuring surface, calculating a stylus displacement vector representing a quantity and a direction of position displacement of the stylus relative to the probe, calculating a moving vector representing a quantity and a direction of movement of the probe during scanning of the measuring surface by the stylus on basis of the stylus displacement vector and a direction change angle of the stylus displacement vector caused by a frictional force between the stylus and the measuring surface, and moving the relative position so that the probe moves in accordance with the moving vector.

According to the shape measuring apparatus and the shape measuring method of the present invention, the direction perpendicular to the measuring surface can be detected from the measuring force, and scanning measurement of the measuring surface by moving the stylus in the direction parallel to the measuring surface can be performed, even if the measuring surface has arbitrary inclinations and the direction of the measuring force is not perpendicular to the measuring surface due to the frictional force. This enables smooth shape measurement with higher accuracy and higher speed, thereby contributing to achievement of miniaturization and increase in accuracy of manufactured products and production with high yield.

BRIEF DESCRIPTION OF DRAWINGS

These and other objects and features of the invention will become apparent from the following description taken in conjunction with preferred embodiments of the invention with reference to the accompanying drawings, in which:

FIGS. 1A and 1B are overall configuration views of a shape measuring apparatus according to a first embodiment of the present invention;

FIG. 6 is a flowchart of the first embodiment of the present invention;

FIG. 8 is a flowchart of the second embodiment of the present invention; and

DETAILED DESCRIPTION OF THE PREFERRED EMBODIMENTS

Figure 1A:
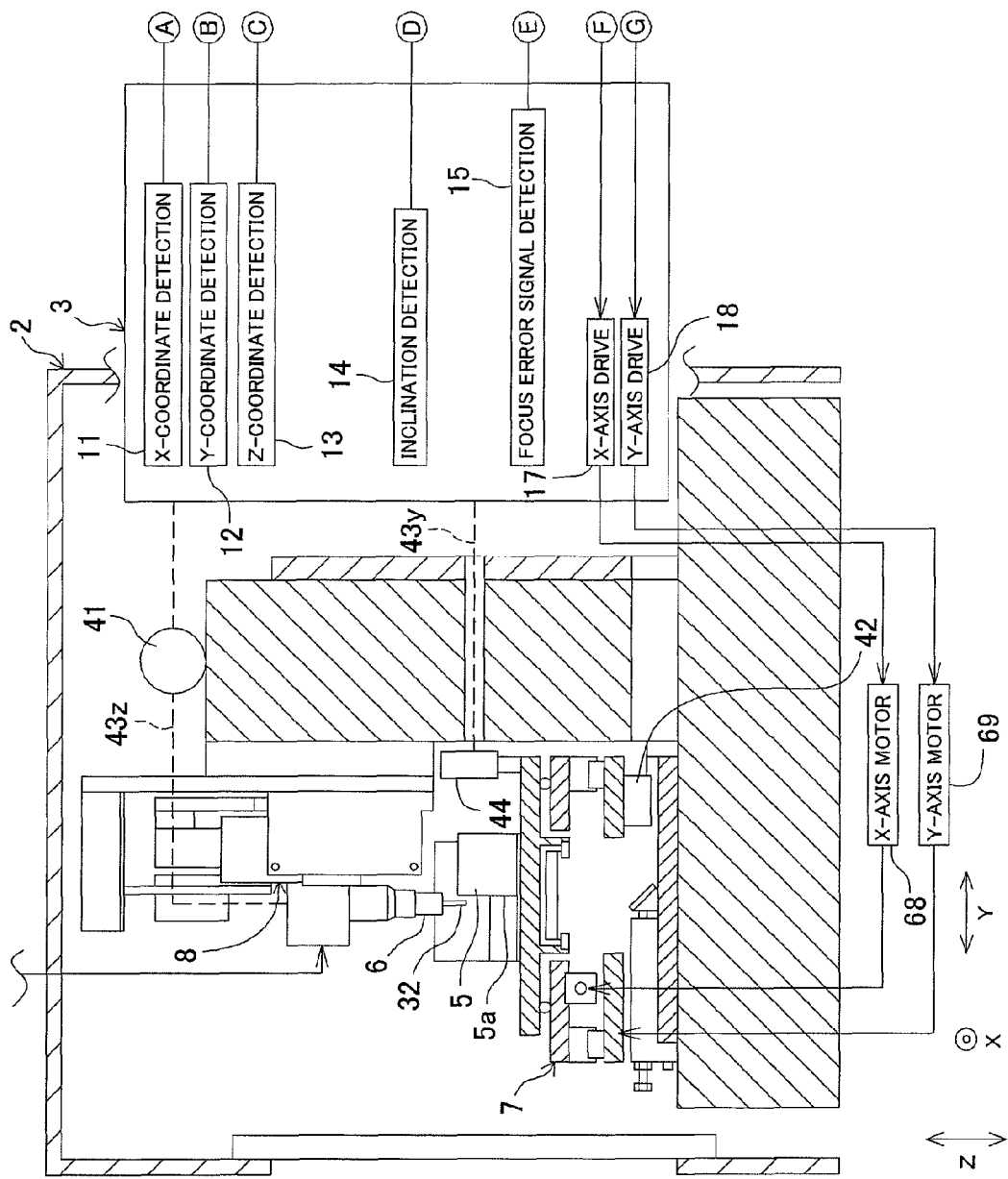

Hereinbelow, embodiments of the present invention will be described with reference to the accompanying drawings. In the drawings, the same components are designated by the same reference signs.

First Embodiment

FIG. 1 shows a general configuration of a three-dimensional shape measuring apparatus 1 (referred to merely as shape measuring apparatus hereinbelow) according to a first embodiment of the invention. The shape measuring apparatus 1 generally includes a three-dimensional measuring device 2, a controller 3 for the three-dimensional measuring device 2, and a computing device 4 composed of a computer.

The three-dimensional measuring device 2 has a probe 6 that scans a measuring surface 5a of a measuring object 5 while contacting with the surface 5a. The three-dimensional measuring device 2 in the embodiment also has an XY-stage 7 for moving the measuring surface 5a in X and Y directions and a Z-stage 8 for moving the probe 6 in Z direction, as a moving unit for moving a relative position between the measuring surface 5a and the probe 6 in the X, Y and Z directions. A configuration in which the prove is moved in the X, Y and Z directions with the measuring surface fixed can be implemented for measurement of large-sized measuring objects The controller 3 is provided with an X-coordinate detection unit 11, a Y-coordinate detection unit 12, a Z-coordinate detection unit 13, an inclination detection unit 14, a focus error signal detection unit 15, an X-axis drive unit 17, and a Y-axis drive unit 18.

The computing device 4 is provided with a measuring point position calculation unit 21, an error calculation and output unit 22, a stylus displacement vector detection unit 23, a moving vector calculation unit 24, a movement instruction unit 25, a dynamic friction coefficient storage unit 26, a servo information storage unit 27, and a scan information storage unit 28.

A coordinate system in this embodiment will be described. The coordinate system in this embodiment is a three-dimensional rectangular coordinate system in which Z-axis extends in a vertical direction and in which X- and Y-axes extend in horizontal directions orthogonal to each other. The coordinate system including an origin is fixed with respect to the measuring object 5. This is because that the shape measuring apparatus 1 is intended for detection of coordinate values representing a shape of the measuring surface in the coordinate system fixed to the measuring object 5. Because the measuring object 5 in this embodiment moves in the X and Y directions as described above, the origin of the coordinate axes fixed to the measuring object 5 moves in the X and Y directions. For facilitation of understanding, it is assumed in following description that the X-, Y-, and Z-coordinate axes are fixed and that the probe 6, a stylus 32, and the like move in the X, Y, and Z directions.

Actually, the measuring objects include those which weigh several hundred kilograms, such as large-sized metal molds, and those which are minute and have masses less than 0.1 gram, such as aspherical lenses of optical disks. For three-dimensional measuring devices intended for measurement of large-sized measuring objects, it is rational to have the configuration in which the probe is moved in the X, Y and Z directions with the measuring object fixed as described above. Contrarily to this, for the three-dimensional measuring devices mainly intended for measurement of minute measuring objects such as that in the present embodiment, it is rational to have a structure in which the measuring object is moved. However, the present invention can be applied regardless of size of the measuring object, and therefore the coordinate system fixed to the measuring object is uniformly used in the following description. The origin of the XYZ-coordinate system can be set at a reasonable point in a shape of the measuring object.

Figure 2:
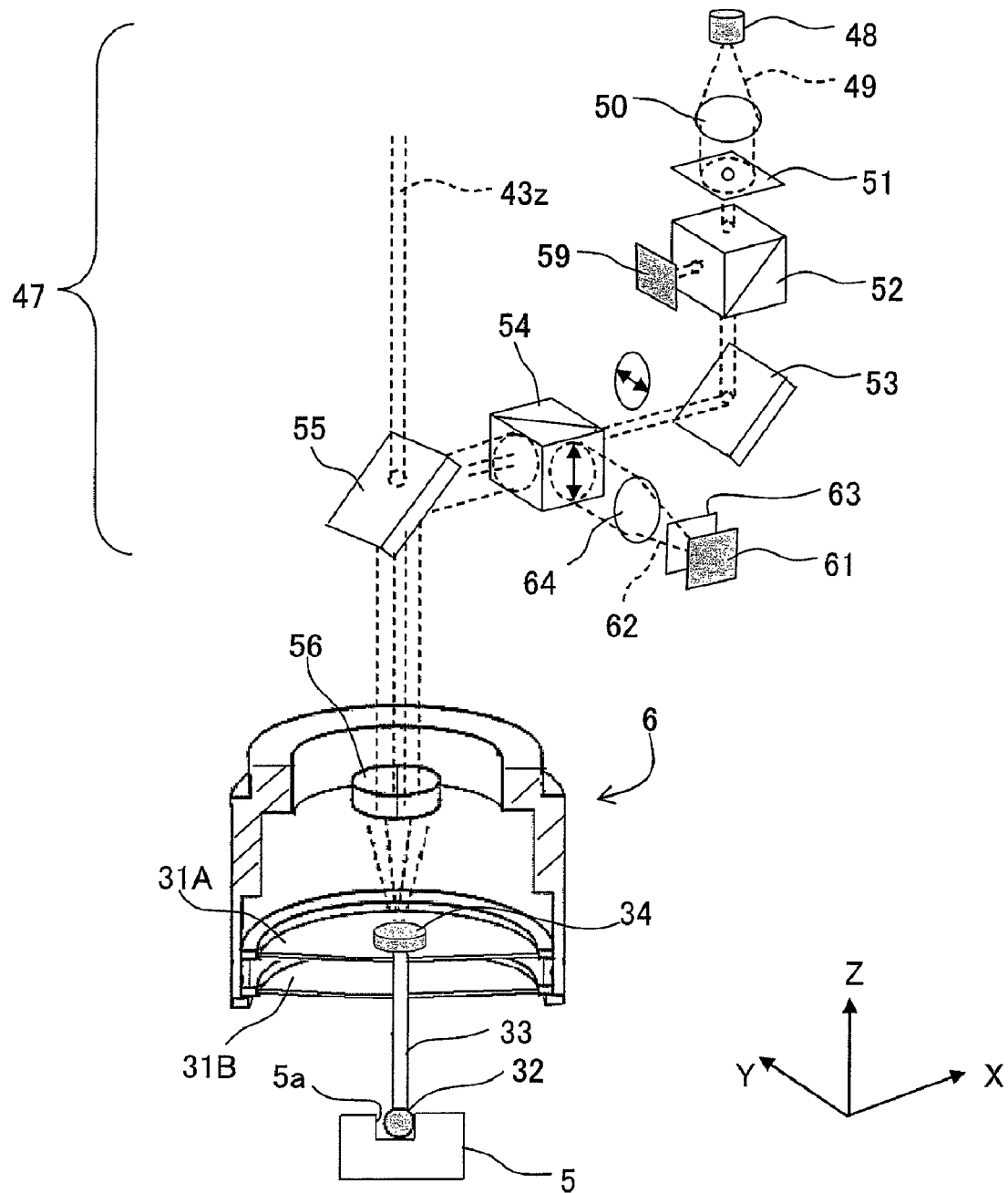
FIG. 2 is a configuration view of a probe in the first embodiment of the present invention.

The probe 6 is mounted on a lower end of the Z-stage 8. Referring to FIG. 2, the probe 6 has the stylus 32 mounted thereon through flexible members 31A and 31B. The flexible members 31A and 31B have a property such as to be deflected when a force is applied thereto. The flexible members 31A and 31B are respectively composed of a metal leaf spring with partial cutouts for vertical and horizontal spring properties, plastic, rubber or the like. The stylus 32 is mounted on a lower end of a stylus shaft 33 fixed to the flexible members 31A and 31B, and a mirror 34 is attached on an upper end of the stylus shaft 33. The stylus 32 can be relatively displaced with respect to the probe 6 in any of the X, Y and Z directions by a measuring force applied to the stylus 32 from the measuring surface 5a. Upon action of the measuring force from the measuring surface 5a on the stylus 32, the measuring force in the X and Y directions deforms the flexible members 31A and 31B so as to tilt the mirror 34, and the measuring force in the Z direction moves the mirror 34 upward.

The probe 6 shown in FIG. 2 can be replaced with other probe 6 shown in FIG. 6. The probe 6 shown in FIG. 6 has the stylus 32 displaceable only in the X and Y directions. The stylus shaft 33 having the stylus 32 on the lower end thereof is fixed integrally to a swinging member 35. The swinging member 35 has a supporting point member 36 of needle or pyramid like shape. An extremity of the supporting point member forms a supporting point 36a that is in contact with a loading platform 37. The swinging member 35 is capable of swinging about the supporting point 36a in the X and Y directions. The swinging member 35 is supported by magnetic forces of magnets 38 and 39 so as to stand upright when the measuring force is zero. In the following description, the probe 6 means that shown in FIG. 2 unless otherwise indicated.

A concept of positions used for measurement and control will be described.

A stylus position S (=(Sx, Sy, Sz)) refers to coordinates of center of a sphere by which a surface of the stylus 32 is approximated.

Figure 3:
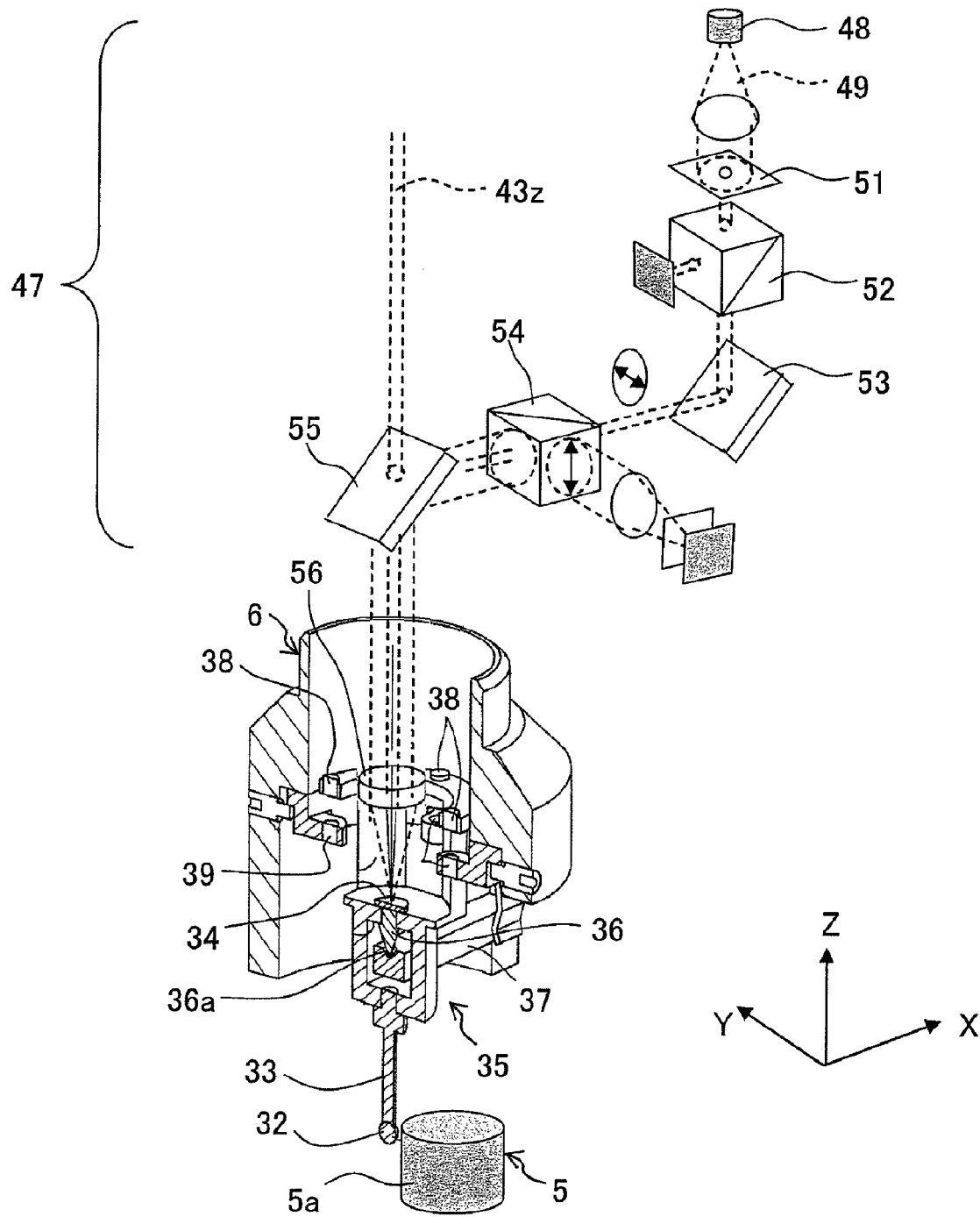
FIG. 3 is a configuration view of a second probe in the first embodiment of the present invention.

Upon the measuring force in the XYZ directions being applied from the measuring surface 5a to the stylus 32, the stylus position S in the probe 6 of FIG. 2 is displaced in the XYZ directions, whereas the stylus position S in the probe 6 of FIG. 3 is displaced in the XY directions. The stylus position S in a state where the stylus 32 is free from displacement in any of the XYZ directions for lack of the measuring force acting on the stylus 32 is defined as a probe position P (=(Px, Py, Pz)). Thus, the stylus position S is coincident with the probe position P when the stylus 32 is not displaced in any of the XYZ directions. Further, the displacement of the stylus 32 by the measuring force causes no change in the probe position P.

A vector representing a quantity and a direction of the displacement of the stylus 32 relative to the probe 6 caused by the measuring force applied to the stylus 32 will be referred to as a stylus displacement vector D (=(Dx, Dy, Dz)). Coordinate components of the stylus displacement vector D are expressed by Equation (1) below.

[Equation 1]

$$D = \begin{pmatrix} Dx \\ Dy \\ Dz \end{pmatrix} = \begin{pmatrix} Sx - Px \\ Sy - Py \\ Sz - Pz \end{pmatrix} \quad (1)$$

In this embodiment, a direction change angle $\theta$ of the stylus displacement vector D and a moving vector M calculated using the direction change angle $\theta$ are used for control. These will be described later in detail.

A configuration for detection of positional information will be described.

Initially, the X-coordinate detection unit 11 causes a branched laser beam (not shown) generated by an oscillation frequency stabilized laser 41 to be reflected on an X-reference mirror 42 fixed to the XY-stage 7. Interference between a reflected beam of the laser beam including optical path length changing information and a reference laser beam not including the optical path length changing information is used for detection of a quantity of travel of the XY-stage 7 in the X direction by a known laser length measuring method. Thus, the X coordinate detection unit 11 measures the X-coordinate Px of the probe position P.

Similarly, the Y-coordinate detection unit 12 causes a branched laser beam 43y generated by the oscillation frequency stabilized laser 41 to be reflected on a Y-reference mirror 44 fixed to the XY-stage 7. Interference between a reflected beam of the laser beam including optical path length changing information and a reference laser beam not including the optical path length changing information is used for detection of a quantity of travel of the XY-stage 7 in the Y direction by the known laser length measuring method. Thus, the Y-coordinate detection unit 12 measures the Y-coordinate Py of the probe position P.

Then, the Z-coordinate detection unit 13 causes a branched laser beam 43z produced by the oscillation frequency stabilized laser 41 to be reflected on a mirror 34 on the upper end of the stylus shaft 33 as shown in FIG. 2. Interference between a reflected beam of the laser beam including optical path length changing information and a reference beam not including the optical path length changing information is used for detection of a quantity of travel of the stylus 32 in the Z direction by the known laser length measuring method. Thus, the Z-coordinate detection unit 13 measures the Z-coordinate Sz of the stylus position S.

As described above, measurement data obtained by the laser length measuring are the X- and Y-coordinates Px and Py of the probe position P and the Z-coordinate of the stylus position S relative to the measuring surface.

Referring to FIG. 2, a laser beam 49 from a semiconductor laser 48 is incident on the mirror 34 on the upper end of the stylus shaft 33 through a collimating lens 50, an aperture 51, a beam splitter 52, a dichroic mirror 53, a polarizing prism 54, a dichroic mirror 55, and a lens 56. The beam 49 reflected from the mirror 34 enters a photodetector 59 through the dichroic mirror 55, the polarizing prism 54, the dichroic mirror 53, and the beam splitter 52. Tilting of the mirror 34 causes a deviation of a incident position of the reflected beam on the photodetector 59. The inclination detection unit 14 (see FIG. 1) detects angles of inclination of the mirror 34, specifically, an inclination angle θx of the stylus 32 in the X direction and an inclination angle θy thereof in the Y direction, with use of the deviation of the incident position on the photodetector 59. The inclination detection unit 14 outputs the inclination angles θx and θy respectively to an X-component detection unit 23A and a Y-component detection unit 23B of the stylus displacement vector detection unit 23. The X-component detection unit 23A and the Y-component detection unit 23B respectively calculate X- and Y-coordinate components Dx and Dy of the stylus displacement vector D from the inclination angles θx and θy and a known distance Ls from a center of inclination of the stylus shaft 33 to the stylus 32 (Equations 2).

[Equations 2]

$$Dx = Ls \times \sin \theta x$$

$$Dy = Ls \times \sin \theta y \quad (2)$$

Referring to FIG. 2, a laser beam 62 from an integrated element 61 of semiconductor laser and photodetector is incident on the mirror 34 on the upper end of the stylus shaft 33 through a diffraction grating 63, a collimating lens 64, the polarizing prism 54, the dichroic mirror 55, and the lens 56. The beam reflected from the mirror 34 returns to the integrated element 61 through the lens 56, the dichroic mirror 55, the polarizing prism 54, the collimating lens 64, and the diffraction grating 63. Upward movement of the mirror 34 causes a deviation in a condensing position of the reflected beam condensed by the collimating lens 64. The focus error signal detection unit 15 (see FIG. 1) detects a quantity of the upward movement of the mirror 34 from the deviation in the condensing position on the photodetector of the integrated element 61. The quantity of the upward movement of the mirror 34 detected by the focus error signal detection unit 15 is not only used for focus control (by which a distance between the inclination detection unit 14 and the stylus 32 is kept constant) but also is outputted to the Z-component detection unit 23C of the stylus displacement vector detection unit 23. The Z-component detection unit 23c calculates the Z-coordinate component Dz of the stylus displacement vector D using the input from the focus error signal detection unit 15.

The measuring point position calculation unit 21 receives the X-coordinate Px of the probe position P from the X-coordinate detection unit 11, the Y-coordinate Py of the probe position P from the Y-coordinate detection unit 12, and the Z-coordinate Sz of the stylus position S from the Z-coordinate detection unit 13. Further, the measuring point position calculation unit 21 receives the X-component Dx and the Y-component Dy of the stylus displacement vector D respectively from the X-component detection unit 23a and the Y-component detection unit 23b of the stylus displacement vector detection unit 23. The measuring point position calculation unit 21 calculates the X-, Y- and Z-coordinates Sx, Sy, and Sz of the stylus position S using these inputs on basis of above-described Equation (1) for the relation among the stylus position S, the probe position P, and the stylus displacement vector D. Specifically, the measuring point position calculation unit 21 in this embodiment calculates the X-, Y- and Z-components Sx, Sy, and Sz of the stylus position S by Equation (3) below.

[Equation 3]

$$S = \begin{pmatrix} Sx \\ Sy \\ Sz \end{pmatrix} = \begin{pmatrix} Px + Dx \\ Py + Dy \\ Sz \end{pmatrix} \quad (3)$$

In this embodiment, the Z-coordinate Sz of the stylus position S is directly determined by the Z-coordinate detection unit 13 as described above. Accordingly, as shown in Equation (3), the Z-component Dz of the stylus displacement vector D is not used for the calculation of the stylus position S as the measurement data but is used for control as will be described later.

The measuring point position calculation unit 21 converts the stylus position S calculated using Equation (3) into positional information (X-, Y- and Z-coordinates) of a measuring point. The conversion can be attained by calculation including trigonometric functions with use of the X, Y and Z coordinates Sx, Sy, and Sz of the stylus position S, the inclination angles of the measuring surface 5a, and a radius of curvature of the stylus 32. A computing method for converting the stylus position S into the positional information of the measuring point is well-known and description thereof is therefore omitted.

The positional information of the measuring point calculated by the measuring point position calculation unit 21 is inputted into the error calculation and output unit 22. The error calculation and output unit 22 compares the positional information of the measuring point inputted from the measuring point position calculation unit 21 with a design value, and calculates an error between the values. A result of the error computing is outputted to a printer 66, a display unit 67, or the like, as required.

On condition that the probe 6 of FIG. 3 (in which the stylus 32 cannot be moved vertically) is used in place of the probe 6 of FIG. 2, the Z coordinate detection unit 13 detects a Z coordinate Pz of the probe position P. In this configuration, the X-component detection unit 23a, the Y-component detection unit 23b, and the Z-component detection unit 23c of the stylus displacement vector detection unit 23 detect the X-component Dx, the Y-component Dy, and the Z-component Dz, respectively, of the stylus displacement vector D with use of the inclination angles θx and θy detected by the inclination detection unit 14 and a stylus length Ls. The measuring point position calculation unit 21 calculates the X, Y and Z coordinates Sx, Sy, and Sz of the stylus position S with use of these values on basis of Equation (4) below.

[Equation 4]

$$S = \begin{pmatrix} Sx \\ Sy \\ Sz \end{pmatrix} = \begin{pmatrix} Px + Dx \\ Py + Dy \\ Pz + Dz \end{pmatrix} \quad (4)$$

On condition that either of the probes 6 of FIGS. 2 and 3 is used, a Z reference mirror for reflecting a laser beam 43z for Z coordinate measurement may be placed above the dichroic mirror 55 in FIGS. 2 and 3. In this case also, the X, Y and Z coordinates Sx, Sy, and Sz of the stylus position S are calculated on basis of Equation (4).

Referring to FIG. 1, the X-, Y- and Z-components Dx, Dy and Dz of the stylus displacement vector D are inputted to the moving vector calculation unit 24 from the X-component detection unit 23a, the Y-component detection unit 23b, and the Z-component detection unit 23c of the stylus displacement vector detection unit 23. As will be described later in detail, the moving vector calculation unit 24 calculates a moving vector M representing a quantity and a direction of movement of the probe 6 with use of the inputted X-, Y- and Z-components Dx, Dy and Dz of the stylus displacement vector D. For the calculation of the moving vector are used a dynamic friction coefficient μ between the stylus 32 and the measuring surface 5a that has been stored in advance in the dynamic friction coefficient storage unit 26, information that has been stored in the servo information storage unit 27 and that is required for execution of servo-on and serve-off which will be described later, and information (including scanning paths, terminating conditions of scanning and the like) that has been stored in the scan information storage unit 28 and that is required for execution of the measuring surface 5a with use of the stylus 32.

The moving vector M calculated by the moving vector calculation unit 24 is outputted to the movement instruction unit 25. The movement instruction unit 25 calculates quantities of movement of the XY stage 7 and the Z stage 8 with use of the moving vector M. The calculated quantities of movement are outputted to the X-axis drive unit 17 and the Y-axis drive unit 18 so that an X-axis motor 68 and a Y-axis motor 69 for the XY stage 7 are activated, and to the Z stage 8.

Hereinbelow a specific example of the measurement will be described with reference to measurement of a shape of an outer wall of a cylindrical measuring object 5 having a dome as in FIGS. 4(a) and 4(b). The measuring object 5 having such a shape can be assumed to be a thick convex lens.

A process in which the probe 6 moves toward the measuring surface 5a until the stylus 32 is brought into contact with the measuring surface 5a with a specified measuring force is referred to as "servo-on" and is designated by a reference sign "i".

Figure 4A:
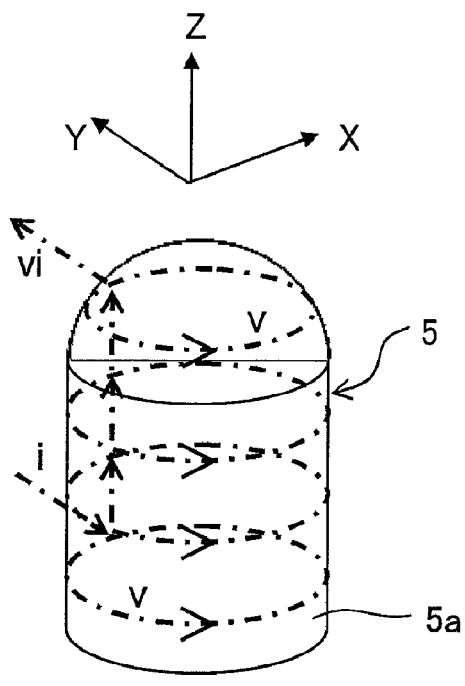
FIGS. 4A and 4B are schematic views for explaining measurement paths in the present invention.

In FIG. 4A, a process after the servo-on in which the stylus 32 moves in a −X direction, goes around lower part of the measuring surface 5a, moves up, goes around center part thereof, moves up, goes around upper part thereof, moves up, and goes around middle part of the dome or a lens surface is referred to as "scanning" or "measurement". The "measurement" process is designated by a reference sign "v". Upon completion of the measurement, the stylus 32 moves away from the measuring surface 5a. This process is referred to as "servo-off and is designated by a reference sign "vi".

Figure 4B:
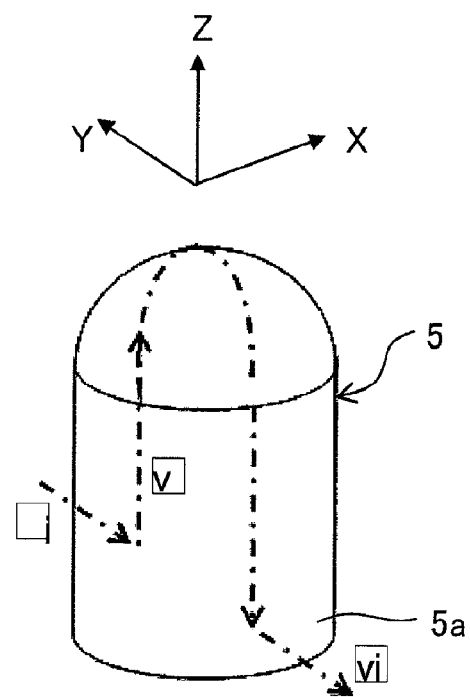

In an example of FIG. 4B, the measuring object 5 has a cylindrical shape as in the case of FIG. 4A, whereas the stylus 32 carries out servo-on (sign "i") up to a side surface of the measuring object 5, moves straight upward on the side surface, sequentially measures the top dome or the lens surface and the side surface on opposite side (sign "v"), and carries out servo-off (sign "vi") from the side surface on the opposite side. With use of the probe 6 of FIG. 3, however, the stylus 32 is not capable of moving in the Z direction and therefore an extremity of the top surface of the measuring object 5 as in FIG. 4B cannot be measured.

In actual measurement, more complicated measuring surfaces are possibly used. It is almost impossible to place the measuring object 5 without any inclination with respect to the three-dimensional measuring device 2. By measurement of the side surface and the top surface of the measuring object 5 in the lump as in the examples of FIGS. 4(a) and 4(b), however, all the measurement data can be obtained in the same coordinate system. Accordingly, coordinate transformation such that differences between all the measurement data and design values of the measuring object are minimized eliminates installation error of the measuring object 5 and makes it possible to detect deviation from desired design values of the measuring object. Such comparison between the measurement data and the design values and detection of deviation between both are preferably carried out in the error calculation and output unit 22.

Figure 5:
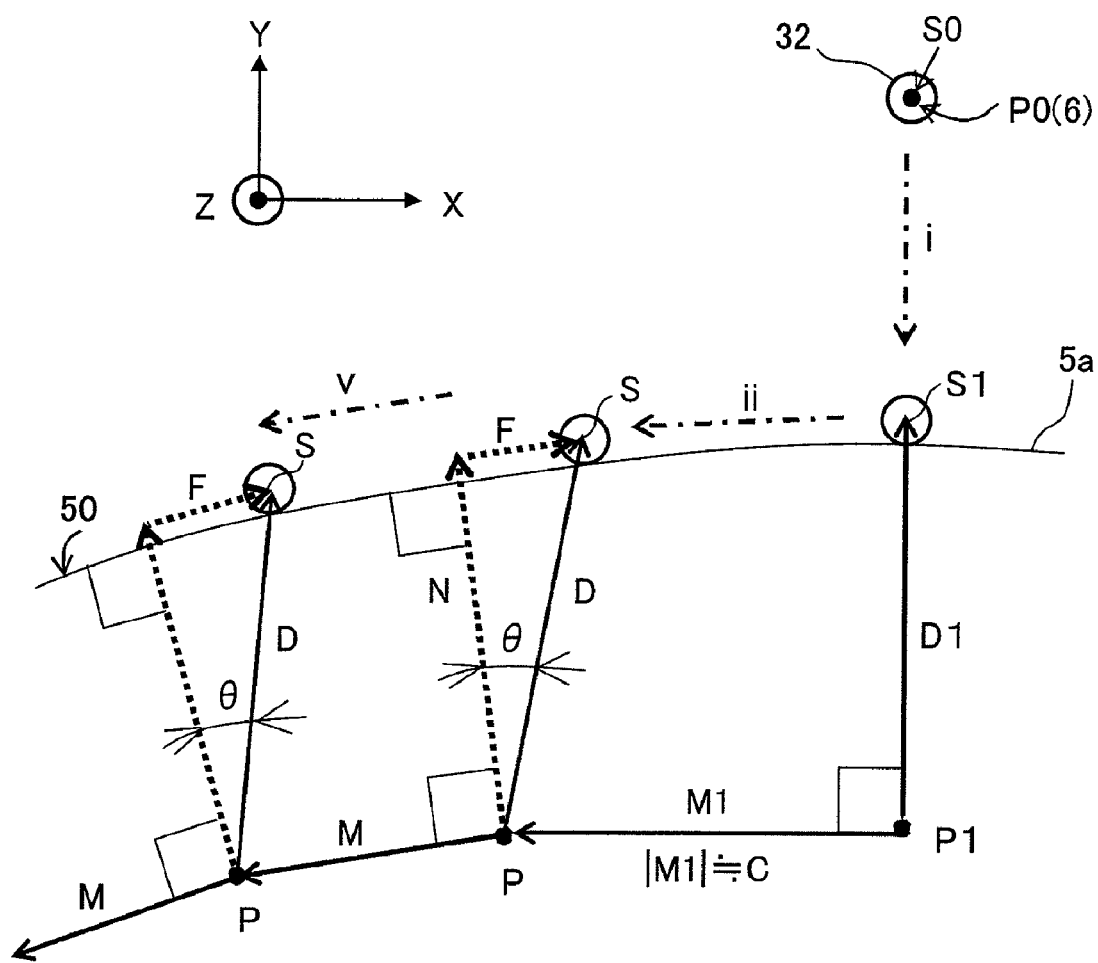
FIG. 5 is a schematic view for explaining the first embodiment of the present invention.

Herein below, a flow of processes from servo-on (sign "i") to measurement (sign "v") in the measurement of FIG. 4A will be described with reference to FIGS. 5 and 6. A path of the measurement is assumed to be in the XY-plane. FIG. 5 is a schematic diagram of the measuring object 5 of FIG. 4A, as seen from above (from the Z direction), and FIG. 6 is a flow chart schematically showing the flow of the processes.

The stylus 32 has a spherical surface having a radius of curvature and is depicted as a circle in FIG. 5. A stylus position of the stylus 32 that is away from the measuring surface 5a and that is not subjected to action of the measuring force is designated by a sign S0. A probe position P on this occasion is designated by a sign P0. The probe position P0 resides in a center of the stylus 32 having the stylus position S0.

The measurement is carried out for detection of a shape of the measuring object 5 and thus a direction in which the measuring surface 5a is oriented can be found only roughly in the servo-on (sign "i"). In the example of FIG. 4A, the cylindrical measuring object 5 is placed in the three-dimensional measuring device 2 so that an axis of the cylinder is coincident with the Z-axis of the three-dimensional measuring device 2, and the probe 6 is moved by eye-estimation, for instance, to vicinity of the side surface of the measuring object 5, that is, to the probe position P0. In the servo-on (sign "i"), the probe 6 is moved from the probe position P0 in a direction of the measuring surface 5a, in general.

In the servo-on (sign "i"), the probe 6 moves toward the measuring surface 5*a* (step S 6-1). A stylus position upon contact of the stylus 32 with the measuring surface 5*a* is designated by a sign S1. The probe 6 moves beyond the measuring surface 5*a*. The movement of the probe 6 is stopped at a probe position P1 (initial position) in which a length of a stylus displacement vector D1 extended to a stylus position S1 has a predetermined value C (e.g., 10 μm)(step S 6-2). In FIG. 5, the probe position P1 is inside the measuring surface 5*a*. The probe position P1, however, is a virtual center of the probe and then the probe 6 does not actually interfere with the measuring surface 5*a*.

In the servo-on (sign "i"), specifically, the probe 6 is moved, while sum of squares of X-, Y-, and Z-components D1*x*, D1*y* and D1*z* of the stylus displacement vector D1 is monitored, and the probe 6 is stopped in a position where a following equation is fulfilled.

[Equation 5]

$$\sqrt{D1x^2 + D1y^2 + D1z^2} = C \quad (5)$$

With use of the probe 6 of FIG. 3, however, the stylus 32 is not displaced in the Z direction and therefore the Z-component D1*z* of the stylus displacement vector D1 is zero.

In order to start the measurement, subsequently, the probe 6 is intended to be moved in a direction parallel to the measuring surface 5*a* in the XY-plane. Assuming zero-friction between the stylus 32 and the measuring surface 5*a*, a direction perpendicular to the stylus displacement vector D1 might become the direction parallel to the measuring surface 5*a*. The friction, however, is not zero in general and thus the direction parallel to the measuring surface 5*a* in the XY-plane slightly deviates from the direction perpendicular to the stylus displacement vector D1. When the probe 6 is in the initial position (probe position P1), there is no way of finding the direction of the measuring surface 5*a*. Therefore, a direction resulting from turning of the stylus displacement vector D1 by 90 degrees is assumed to be the direction parallel to the measuring surface 5*a*.

For the turning of the stylus displacement vector D1 by 90 degrees, an axis of the turning is required to be specified. In this example, the measurement is performed in the XY-plane and thus the Z-axis is specified as the axis of the turning. When the measurement is performed in the YZ-plane as in FIG. 4B, the X-axis is specified as the axis of the turning.

When a vector having components x, y and z is turned by an angle γ about the Z-axis, in general, X-, Y-, and Z-components (u, v, w) thereof after the turning are expressed by Equation (6) below.

[Equation 6]

$$\begin{pmatrix} u \\ v \\ w \end{pmatrix} = \begin{pmatrix} \cos\gamma & -\sin\gamma & 0 \\ \sin\gamma & \cos\gamma & 0 \\ 0 & 0 & 1 \end{pmatrix} \begin{pmatrix} x \\ y \\ z \end{pmatrix} \quad (6)$$

Provided that the servo-on has been achieved on the side surface of the measuring object 5 as in FIG. 4A, application of Equation (6) having γ=π/2 to the stylus displacement vector D1 provides the direction parallel to the measuring surface 5*a* in the XY-plane. On condition that the stylus 32 can relatively be displaced in the X, Y and Z directions with respect to the probe 6 as in FIG. 2, however, the turning with simple application of Equation (6) to the stylus displacement vector D1 fails to provide the direction parallel to the measuring surface 5*a* in the XY-plane. In this case, specifically, the measuring surface 5*a* is inclined also in the Z direction and thus the stylus displacement vector D1*z* is not zero. Therefore, the turning according to Equation (6) with γ=π/2 leaves the Z-component. Thus the resultant direction deviates from a direction in the XY-plane in which the measurement is intended to be performed and fails to be perpendicular to the stylus displacement vector D1.

In the embodiment, accordingly, a vector having only the X- and Y-components of the stylus displacement vector D1 is turned in accordance with Equation (6) with γ=π/2. This provides the direction perpendicular to the stylus displacement vector D1 in the XY-plane. In this way, the direction parallel to the measuring surface 5*a* in the XY-plane can be obtained by the application of Equation (6) to only the X- and Y-components of the stylus displacement vector D1, irrespective of whether the probe 6 is that of FIG. 2 or of FIG. 3 and whether the measuring surface 5*a* is perpendicular to the XY-plane or not.

"M1" in Equation (7) obtained from the X- and Y-components of the stylus displacement vector that are turned according to Equation (6) with γ=π/2, divided by a length thereof into a unit vector, and thereafter multiplied by a velocity V1 is referred to as moving vector. Strictly, the moving vector M1 is that on occasion when the probe 6 moves in the first place from the initial position (probe position P0).

[Equation 7]

$$M1 = \begin{pmatrix} M1x \\ M1y \end{pmatrix} = \frac{V1}{\sqrt{D1x^2 + D1y^2}} \begin{pmatrix} -D1y \\ D1x \end{pmatrix} \quad (7)$$

As in FIG. 5, the probe is moved approximately by a distance C in accordance with the moving vector M1. That is, actuation along the X- and Y-axes is simultaneously carried out by the X-axis motor 68 run at a velocity of M1*x* and the Y-axis motor 69 run at a velocity of M1*y* in accordance with the moving vector M1, so that the probe is moved approximately by the distance C.

The moving vector M1 may be found by turning of the stylus displacement vector D1 onto the XY-plane about the X-axis by a turning angle φ and subsequent turning thereof about the Z-axis by 90 degrees. The turning angle φ is expressed by Equation (8) below. A formula of the moving vector M1 is as is defined by Equation (9) below.

[Equation 8]

$$\varphi = -atn(D1z/D1y) \quad (8)$$

[Equation 9]

$$M1 = \begin{pmatrix} M1x \\ M1y \\ M1z \end{pmatrix} = \frac{V1}{C} \begin{pmatrix} \cos(\pi/2) & -\sin(\pi/2) & 0 \\ \sin(\pi/2) & \cos(\pi/2) & 0 \\ 0 & 0 & 1 \end{pmatrix} \begin{pmatrix} 1 & 0 & 0 \\ 0 & \cos\phi & -\sin\phi \\ 0 & \sin\phi & \cos\phi \end{pmatrix} \begin{pmatrix} D1x \\ D1y \\ D1z \end{pmatrix} \quad (9)$$

On condition that the moving vector M1 is calculated by Equation (9), Z-component M1*z* misses complete zero unless the friction is zero. In the scanning measurement which is performed in the XY-plane, however, the Z-component M1*z* of the moving vector M1 calculated by Equation (9) may be replaced by zero, and the probe 6 may be moved in accordance with a vector that has the X-component M1*x* and the Y-component M1*z* and that is used as the moving vector M1.

Subsequently, the distance C will be described. When a traveling distance of the probe 6 is small, there is a possibility that the stylus 32 does not move from the stylus position S1 because of static friction though the probe 6 moves from the probe position P1. When the traveling distance of the probe 6 is large, there is a possibility that the deviation in magnitude of the stylus displacement vector D is increased because the stylus displacement vector D1 is not completely perpendicular to the measuring surface 5*a* when the probe 6 is in the initial position (probe position P1) and because the inclination angle of the measuring surface 5*a* may change. The distance C is set at a distance which is minimal in a range satisfying a condition that the stylus 32 is moved on the measuring surface 5*a* with the movement of the probe 6 and which can be assumed to be minute in comparison with unevenness of the measuring surface 5*a*. With such setting of the distance C, movement of the probe 6 by at least the distance C must result in movement of the stylus 32 from the stylus S1 because a coefficient of friction is less than 1 in general (On condition that the coefficient of friction is 1 based on Equation (10) which will be described later, the stylus 32 stands still in the stylus position S by action of a frictional force until the probe 6 moves from a probe position P by the distance C).

Subsequently, calculation of the moving vector M in the scanning measurement (signs ii, v in FIG. 5) will be described. Assuming that a position of the probe 6 having moved approximately by the distance C from the initial position (probe position P1) in accordance with the moving vector M1 is defined as a first probe position P, a stylus position S at the first probe position P, due to influence of a dynamic frictional force, deviates by a vector F (corresponding to the dynamic frictional force) with respect to a vector N (corresponding to a pressing force of the stylus 6 against the measuring surface 5*a*) extending from the probe position P and being perpendicular to the measuring surface 5*a*. As a result, the stylus displacement vector D deviates from the vector N by the direction change angle θ. A relation between a dynamic friction coefficient μ between the stylus 32 and the measuring surface 5*a* and the direction change angle θ is expressed by Equation (10).

[Equation 10]

μ="frictional force"/"pressing force in direction perpendicular to surface"=|F|/|N|=tan θ hence $$\theta = a\tan\mu \quad (10)$$

Provided that the dynamic friction coefficient μ has already been known as in the embodiment, the direction change angle θ can be found by Equation (10). The direction parallel to the measuring surface 5*a* is that angled at θ+90 degrees relative to the stylus displacement vector D at a point in time when the probe 6 is in the probe position P. Accordingly, a moving vector M at the point in time when the probe 6 is in the probe position P is defined as a vector by which the probe 6 is moved at a velocity V in the direction angled at θ+90 degrees. Provided that X- and Y-components of the moving vector M are designated by signs Mx and My, respectively, the moving vector M in the measurement of the cylindrical side surface of the measuring object 5 of FIG. 4A is expressed by Equation (11) below.

[Equation 11]

$$\begin{pmatrix} Mx \\ My \end{pmatrix} = \frac{V}{C} \begin{pmatrix} \cos(\theta + \pi/2) & -\sin(\theta + \pi/2) \\ \sin(\theta + \pi/2) & \cos(\theta + \pi/2) \end{pmatrix} \begin{pmatrix} Dx \\ Dy \end{pmatrix} \quad (11)$$

The moving vector M in the measurement of the lens-like part of the top surface of the measuring object 5 of FIG. 4A is expressed by Equation (12) below.

[Equation 12]

$$\begin{pmatrix} Mx \\ My \\ Mz \end{pmatrix} = \frac{V}{C} \begin{pmatrix} \cos(\theta + \pi/2) & -\sin(\theta + \pi/2) & 0 \\ \sin(\theta + \pi/2) & \cos(\theta + \pi/2) & 0 \\ 0 & 0 & 1 \end{pmatrix} \begin{pmatrix} 1 & 0 & 0 \\ 0 & \cos\phi & -\sin\phi \\ 0 & \sin\phi & \cos\phi \end{pmatrix} \begin{pmatrix} Dx \\ Dy \\ Dz \end{pmatrix} \quad (12)$$

In accordance with the moving vector M, the X-axis motor 68 and the Y-axis motor 69 are simultaneously run at velocities of Mx and My, respectively. The Z-component Mz of the moving vector M calculated by Equations (11), (12) still has a small value. In the embodiment, however, the stylus 32 is intended to be moved in the XY-plane and thus the Z-component Mz is replaced by zero. After that, the stylus displacement vectors Dx, Dy are acquired at uniform time intervals determined by a speed of calculation of a computer and the like or at uniform intervals of traveling distance determined by roughness of the measuring surface and the like while the probe is moved in accordance with the moving vector M of Equation (11) or (12). The probe is then moved while the moving vector M is calculated and updated. Thus the probe can be moved in the direction parallel to the measuring surface even if there is change in the inclination angle of the measuring surface. This operation is repeated until the probe position P reaches a specified position (step S6-4). Once the probe position P reaches the specified position, the movement of the probe 6 is halted (step S6-5). After that, the probe 6 is moved in a direction of a stylus displacement vector D by a distance larger than the stylus displacement vector D, and the servo-off (sign "vi" in FIG. 4) is performed (step S6-6).

In the above description, the direction in which the measurement is intended to be performed (the plane in which the stylus 32 is intended to be moved) is in the XY-plane. When the measurement is intended to be performed in a path in the YZ-plane as in FIG. 4B, signs X and Y in the above description have only to be replaced by signs Y and Z, respectively. In Equations (9) and (12), the stylus displacement vector D is initially turned about the X-axis. When the probe 6 is not moved in the direction of the X-axis, however, the stylus displacement vector D has to be turned about an axis along a direction of the movement instead of the X-axis. As for this point, the scanning measurement just as stated in the above description can be performed with configuration of a coordinate system in which the probe 6 moves in the −X direction in the XY-plane and which moves together with the probe 6.

In the shape measurement of the embodiment, as described above, the stylus can be moved in the direction along the measuring surface even if the displacement of the stylus caused by the measuring force from the measuring surface inclined in an arbitrary direction deviates from the direction perpendicular to the measuring surface by the frictional force acting in the direction of the movement of the stylus. Besides, the stylus can smoothly be moved in a direction along the measuring surface inclined in an arbitrary direction. As a result, the shape measurement of the embodiment increases accuracy and velocity of the measurement and makes the measuring force constant.

Second Embodiment

Figure 7:
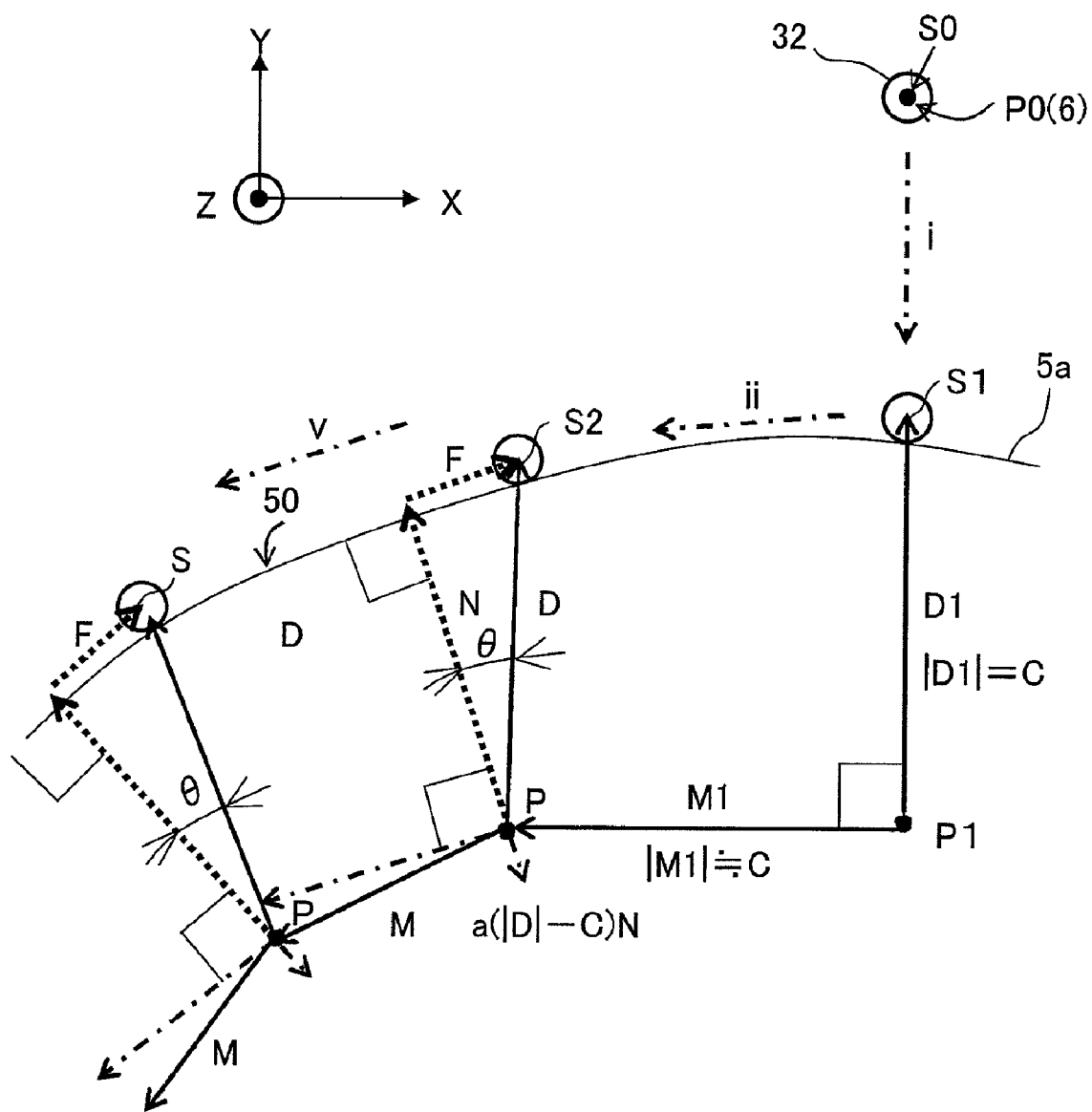
FIG. 7 is a schematic view for explaining a second embodiment of the present invention.

To a second embodiment is added control for making absolute values of the stylus displacement vectors D constant. Hereinbelow, description will be made with reference to FIGS. 7 and 8. After the servo-on (sign "i"), as is the case with the first embodiment, the probe 6 is moved to the first probe position P approximately by the distance C in accordance with the moving vector M1 (steps S8-1 to S8-3 in FIG. 8).

Subsequently, the probe 6 is moved in accordance with a moving vector M1 that is a direction obtained from addition of a(|D|−C)N to the moving vector M1 described in the first embodiment. Herein, a is a coefficient corresponding to a servo gain, and N is a vector perpendicular to a section of the measuring surface 5a taken along the XY-plane and is derived from Equation (13) below.

[Equation 13]

$$\begin{pmatrix} Nx \\ Ny \end{pmatrix} = \begin{pmatrix} \cos\theta & -\sin\theta \\ \sin\theta & \cos\theta \end{pmatrix} \begin{pmatrix} Dx \\ Dy \end{pmatrix} \quad (13)$$

The moving vector M is expressed by Equation (14) below.

[Equation 14]

$$\begin{pmatrix} Mx \\ My \end{pmatrix} = \frac{V}{C} \begin{pmatrix} \cos(\theta + \pi/2) & -\sin(\theta + \pi/2) \\ \sin(\theta + \pi/2) & \cos(\theta + \pi/2) \end{pmatrix} \begin{pmatrix} Dx \\ Dy \end{pmatrix} + a\left(\sqrt{Dx^2 + Dy^2 + Dz^2} - C\right) \begin{pmatrix} \cos\theta & -\sin\theta \\ \sin\theta & \cos\theta \end{pmatrix} \begin{pmatrix} Dx \\ Dy \end{pmatrix} \quad (14)$$

In accordance with the moving vector M, the X-axis motor 68 and the Y-axis motor 69 are simultaneously run at velocities of Mx and My respectively. After that, the stylus displacement vectors Dx, Dy are acquired at uniform time intervals determined by a speed of calculation of a computer and the like or at uniform intervals of traveling distance determined by roughness of the measuring surface and the like while the probe 6 is moved in accordance with the moving vector M of Equation (14). The probe 6 is then moved while the moving vector M is calculated and updated. By the movement of the probe 6 with the update of the moving vector M on basis of values calculated from Equation (14), the scanning can be performed so as not to cause change in magnitude (corresponding to quantity in which the probe 6 is pushed in with respect to the surface to be measured) of the stylus displacement vector D, irrespective of change in the inclination angle of the measuring surface 5a, and the probe 6 can be moved more accurately in the direction parallel to the measuring surface 5.

This operation is repeated until the probe position P reaches a specified position (step S8-4). Once the probe position P reaches the specified position, the movement of the probe 6 is halted (step S8-5). After that, the probe 6 is moved in a direction of a stylus displacement vector D by a distance larger than the stylus displacement vector D, and the servo-off (sign "vi" in FIG. 4) is performed (step S8-6).

Third Embodiment

In a third embodiment will be described measurement procedures for actually measuring the dynamic friction coefficient μ between the stylus 32 and the measuring surface 5a on condition that the dynamic friction coefficient μ is unknown or that more accurate determination of the dynamic friction coefficient μ is desired. After the dynamic friction coefficient μ obtained from the following measurement procedures is used, scanning measurement of the measuring surface 5a is performed with the movement of the probe 6 in accordance with the moving vector M1 as described in Embodiments 1 and 2. That is, the actual measurement of the dynamic friction coefficient μ that will be described in the embodiment is performed before the scanning measurement. Provided that the dynamic friction coefficient μ is actually measured as in the embodiment, the computing device 4 has a configuration without the dynamic friction coefficient storage unit 26.

Figure 9:
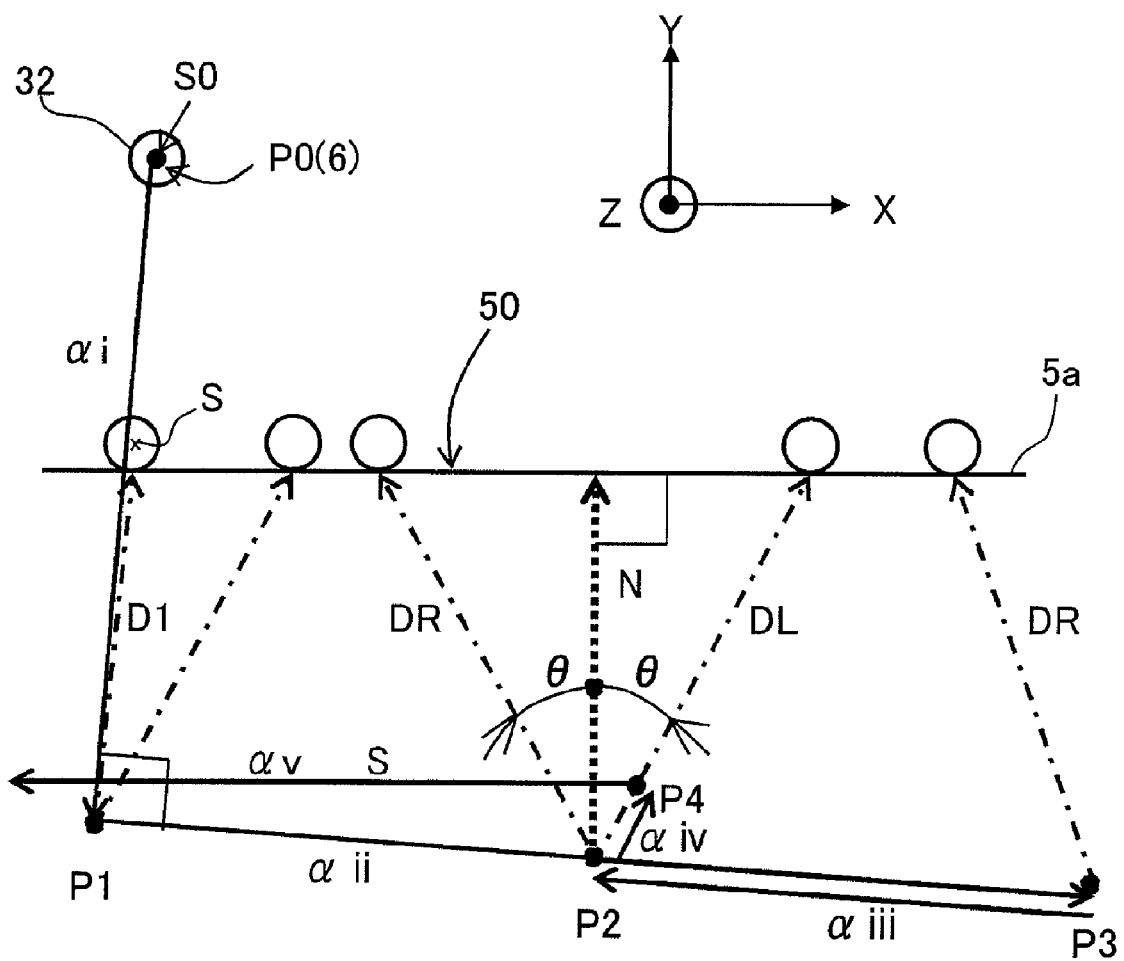
FIG. 9 is a schematic view for explaining a third embodiment of the present invention.

Hereinbelow, description will be made with reference to FIG. 9. FIG. 9 depicts a part of the measuring surface 5a with enlargement and approximation by a plane. In the servo-on, the probe 6 is moved toward the measuring surface 5a along a path αi. The stylus 32 moves to the stylus position S in which the stylus 32 is in contact with the measuring surface 5a and then remains on the measuring surface 5a, while the probe 6 moves to a probe position P1 where a distance C to the stylus position S is equal to a stylus displacement vector D1. Though the stylus displacement vector D1 is perpendicular to the measuring surface 5a with the friction being zero, the stylus displacement vector D1 is not completely perpendicular to the measuring surface 5a in presence of the friction.

Subsequently, the dynamic friction coefficient μ between the stylus 32 and the measuring surface 5a is measured as follows. The probe 6 is then moved from the probe position P1 through a probe position P2 to a probe position P3 in a direction that is perpendicular to the stylus displacement vector D1 and that is opposite to a direction in which the measurement is intended to be performed, i.e., the rightward direction designated by a sign αii in FIG. 9. Distances from the probe position P1 to the probe position P2 and from the probe position P2 to the probe position P3 are made slightly longer than the distance C. For the stylus 32 is required to be moved without fail in presence of a large friction coefficient, while too large traveling distance of the probe 6 might lead to remarkable change in the inclination angle of the measuring surface 5a and might cause an error in the measurement of the friction coefficient.

A stylus displacement vector at a point when the probe 6 reaches the probe position P2 in the movement is designated by $D_R$. A direction of the stylus displacement vector $D_R$ is not perpendicular to the measuring surface 5a because of a frictional force as shown in the drawing. Then X-, Y-, and Z-components $D_Rx$, $D_Ry$ and $D_Rz$ of the stylus displacement vector $D_R$ are stored.

After the probe 6 reaches the probe position P3, the probe 6 is moved in a leftward direction in the drawing on the same path, as shown by a sign "αiii". A stylus displacement vector at a point in time when the probe 6 reaches the probe position P2 is designated by $D_L$. Then X-, Y-, and Z-components $D_Lx$, $D_Ly$ and $D_Lz$ of the stylus displacement vector $D_L$ are stored.

Presence of friction between the stylus 32 and the measuring surface 5a leads to lack of coincidence between directions of the stylus displacement vectors $D_L$ and $D_R$ as shown in the drawing. Even if the traveling path of the probe 6 is not completely parallel to the measuring surface 5a, lengths of the stylus displacement vectors $D_L$ and $D_R$ are equal to each other because the dynamic friction coefficients in the leftward and rightward movement (paths αi and αii) are equal. In FIG. 9, angles that the stylus displacement vectors $D_L$ and $D_R$ form with the vector N (expressed by Equation (10) described above) are equal to each other and are made into the direction change angle θ. Therefore, Equation (15) below is obtained from a geometrical relation of FIG. 9.

[Equation 15]

$$\sin\theta = \frac{1}{2}|D_R - D_L|/|D_L| \quad (15)$$
$$= \frac{1}{2}\frac{\sqrt{(D_Rx - D_Lx)^2 + (D_Ry - D_Ly)^2 + (D_Rz - D_Lz)^2}}{\sqrt{D_Lx^2 + D_Ly^2 + D_Lz^2}}$$

On basis of Equation (15), the direction change angle θ can be calculated from following Equation (16) using the X-, Y-, and Z-components of the stylus displacement vectors $D_L$ and $D_R$. The direction change angle θ can be found by Equation (16).

[Equation 16]

$$\theta = a\sin\left(\frac{1}{2}\frac{\sqrt{(D_Rx - D_Lx)^2 + (D_Ry - D_Ly)^2 + (D_Rz - D_Lz)^2}}{\sqrt{D_Lx^2 + D_Ly^2 + D_Lz^2}}\right) \quad (16)$$

For the probe 6 having the stylus 32 that is shown in FIG. 3 and that can be displaced only in the X and Y directions, the Z-components of the stylus displacement vectors $D_L$ and $D_R$ are zero at all times and thus θ can be found by Equation (17) below.

[Equation 17]

$$\theta = a\sin\left(\frac{1}{2}\frac{\sqrt{(D_Rx - D_Lx)^2 + (D_Ry - D_Ly)^2}}{\sqrt{D_Lx^2 + D_Ly^2}}\right) \quad (17)$$

Subsequently, the probe 6 is moved from the probe position P2 to the probe position P4 in a direction of the stylus displacement vector $D_L$ until a length has a given value, as shown by a sign "αiv". After that, the direction of the movement is changed by θ+90 degrees, the probe 6 is moved in a direction S parallel to the measuring surface 5*a* as shown by a sign αv, and measurement is performed as in Embodiments 1 and 2.

The shape measuring apparatus and the shape measuring method of the invention increase accuracy and velocity of the measurement and make the measuring force constant. Thus the invention can be applied to measurement of shape of aspherical lens and eccentric accuracy with respect to side face thereof, barrel of zoom lens, shape of zoom groove, shapes of shaft diameter, inside diameter of oil hydrodynamic bearing, and groove of bearing side face in hard disk driving motor, shapes of inside diameter and outside diameter of metal mold for components of general electronic products, shape of gear tooth, and the like, for which it has conventionally been impossible to be measured and thus to be improved in accuracy or yield.

Although the present invention has been fully described in conjunction with preferred embodiments thereof with reference to the accompanying drawings, various changes and modifications are possible for those skilled in the art. Therefore, such changes and modifications should be construed as included in the present invention unless they depart from the intention and scope of the invention as defined by the appended claims.

What is claimed is:

1. A shape measuring apparatus, comprising:
    a probe for supporting a stylus so that the stylus can be displaced by a measuring force from a measuring surface;
    a moving unit for moving a relative position between the probe and the measuring surface so that the stylus scans the measuring surface;
    a stylus displacement vector detection unit for detecting a stylus displacement vector representing a quantity and a direction of position displacement of the stylus relative to the probe;
    a moving vector calculation unit for calculating a moving vector representing a quantity and a direction of movement of the probe during scanning of the measuring surface by the stylus on basis of the stylus displacement vector and a direction change angle of the stylus displacement vector caused by a frictional force between the stylus and the measuring surface; and
    a movement control unit for controlling the moving unit so that the probe moves in accordance with the moving vector.

2. The shape measuring apparatus according to claim 1, wherein the moving vector calculation unit calculates the moving vector as a vector obtained from rotation of the stylus displacement vector by a sum of the direction change angle and 90 degrees.

3. The shape measuring apparatus according to claim 2, wherein the direction change angle is an arctangent of a dynamic friction coefficient between the stylus and the measuring surface.

4. The shape measuring apparatus according to claim 2, wherein the moving vector calculation unit calculates the direction change angle on basis of a difference between a first stylus displacement vector when the stylus scans a path on the measuring surface in a first direction and a second stylus displacement vector when the stylus scans the same path on the measuring surface in a second direction opposite to the first direction.

5. The shape measuring apparatus according to claim 1, wherein the moving vector calculation unit calculates a first vector obtained from rotation of the stylus displacement vector by a sum of the direction change angle and 90 degrees,
    wherein the moving vector calculation unit calculates a second vector by multiplying a vector obtained from rotation of the stylus displacement vector by the direction change angle and oriented substantially perpendicular to the measuring surface by a scalar value, the scalar value being obtained by multiplying a difference, which is obtained by subtracting a predetermined value from a magnitude of the stylus displacement vector, by a predetermined coefficient, and
    wherein the moving vector calculation unit calculates the moving vector as a sum of the first and second vectors.

6. The shape measuring apparatus according to claim 5, wherein the direction change angle is an arctangent of a dynamic friction coefficient between the stylus and the measuring surface.

7. The shape measuring apparatus according to claim 5, wherein the moving vector calculation unit calculates the direction change angle on basis of a difference between a first stylus displacement vector when the stylus scans a path on the measuring surface in a first direction and a second stylus displacement vector when the stylus scans the same path on the measuring surface in a second direction opposite to the first direction.

8. The shape measuring apparatus according to claim 1, wherein, at start of scanning of the measuring surface by the stylus, the movement control unit moves the probe to an initial position at which the stylus is in contact with the measuring surface and the magnitude of the stylus displacement vector has a predetermined value, and then moves the probe by a predetermined distance in a direction perpendicular to the stylus displacement vector at the initial position.

9. The shape measuring apparatus according to claim 8, wherein the predetermined distance from the initial position is set to the same value as the predetermined value when the probe moves to the initial position.

10. A shape measuring method comprising:
    moving a relative position between a probe and a measuring surface so that a stylus scans the measuring surface, the stylus being supported so as to be capable of displacing relative to the prove by a measuring force from the measuring surface;
    calculating a stylus displacement vector representing a quantity and a direction of position displacement of the stylus relative to the probe;
    calculating a moving vector representing a quantity and a direction of movement of the probe during scanning of the measuring surface by the stylus on basis of the stylus displacement vector and a direction change angle of the stylus displacement vector caused by a frictional force between the stylus and the measuring surface; and
    moving the relative position so that the probe moves in accordance with the moving vector.

11. The shape measuring method according to claim 10, wherein the moving vector is a vector obtained from rotation of the stylus displacement vector by a sum of the direction change angle and 90 degrees.

12. The shape measuring method according to claim 11, wherein the direction change angle is an arctangent of a dynamic friction coefficient between the stylus and the measuring surface.

13. The shape measuring method according to claim 11, wherein the direction change angle is calculated on basis of a difference between a first stylus displacement vector when the stylus scans a path on the measuring surface in a first direction and a second stylus displacement vector when the stylus scans the same path on the measuring surface in a second direction opposite to the first direction.

14. The shape measuring method according to claim 10, further comprising:
    calculating a first vector obtained from rotation of the stylus displacement vector by a sum of the direction change angle and 90 degrees;
    calculating a second vector by multiplying a vector obtained from rotation of the stylus displacement vector by the direction change angle and oriented substantially perpendicular to the measuring surface by a scalar value, the scalar value being obtained by multiplying a difference, which is obtained by subtracting a predetermined value from a magnitude of the stylus displacement vector, by a predetermined coefficient; and
    calculating the moving vector as a sum of the first and second vectors.

15. The shape measuring method according to claim 14, wherein the direction change angle is an arctangent of a dynamic friction coefficient between the stylus and the measuring surface.

16. The shape measuring method according to claim 14, wherein the direction change angle is calculated on basis of a difference between a first stylus displacement vector when the stylus scans a path on the measuring surface in a first direction and a second stylus displacement vector when the stylus scans the same path on the measuring surface in a second direction opposite to the first direction.

17. The shape measuring method according to claim 10, wherein, at start of scanning of the measuring surface by the by the stylus, the probe is moved to an initial position at which the stylus is in contact with the measuring surface and the magnitude of the stylus displacement vector has a predetermined value, and then moved by a predetermined distance in a direction perpendicular to the stylus displacement vector at the initial position.

18. The shape measuring method according to claim 17, wherein the predetermined distance from the initial position is set to the same value as the predetermined value when the probe is moved to the initial position.

* * * * *